United States Patent
Terai et al.

(10) Patent No.: US 7,450,170 B2
(45) Date of Patent: Nov. 11, 2008

(54) EXPOSURE CONTROL METHOD OF IMAGING APPARATUS

(75) Inventors: Takashi Terai, Kanagawa (JP); Yusuke Nanjo, Kanagawa (JP); Kunioki Takahashi, Chiba (JP); Koji Okajima, Kanagawa (JP); Asuka Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 777 days.

(21) Appl. No.: 10/892,234

(22) Filed: Jul. 16, 2004

(65) Prior Publication Data

US 2005/0046737 A1  Mar. 3, 2005

(30) Foreign Application Priority Data

Jul. 24, 2003 (JP) ............................. 2003-278978

(51) Int. Cl.
  *H04N 5/238* (2006.01)
  *H04N 5/225* (2006.01)
(52) U.S. Cl. .................... 348/342; 348/229.1; 348/360; 348/364; 396/213

(58) Field of Classification Search ............ 348/208.11, 348/208.12, 221.1, 220.1, 224.1, 360, 361, 348/362, 363
See application file for complete search history.

(56) References Cited

U.S. PATENT DOCUMENTS 6,930,723 B1 * 8/2005 Tsuda et al. ................. 348/363
2007/0065135 A1 3/2007 Takei et al.

FOREIGN PATENT DOCUMENTS

| JP | 10210487 | * | 7/1998 |
| JP | 11-220652 | | 8/1999 |
| JP | 2000-10150 | | 1/2000 |
| JP | 2001-222039 | | 8/2001 |
| JP | 2002-135650 | | 5/2002 |

* cited by examiner

*Primary Examiner*—Ngoc-Yen Vu
*Assistant Examiner*—Selam T Gebriel
(74) *Attorney, Agent, or Firm*—Oblon, Spivak, McClelland, Maier & Neustadt, P.C.

(57) ABSTRACT

When a brightness level of an object is below a predetermined level, an ND filter is removed from an iris opening to fully open the iris opening, and when the brightness level of the object is above a predetermined level, the ND filter is placed to the iris opening to fully close the iris opening. When the ND filter is moved between the fully-opened state and the fully-closed state, an exposure change amount corresponding to an amount offsetting the exposure change amount due to a state transition is generated by controlling iris blades.

5 Claims, 3 Drawing Sheets

EXPOSURE CONTROL METHOD OF IMAGING APPARATUS

CROSS REFERENCE TO RELATED APPLICATION

This application claims priority from Japanese Priority Document No. 2003-278978, filed on Jul. 24, 2003 with the Japanese Patent Office, which document is hereby incorporated by reference.

BACKGROUND OF THE INVENTION

1. Field of the Invention

The present invention relates to an exposure control method of an imaging apparatus such as a video camera, a digital still camera and the like which uses a solid state imaging device, for example.

2. Description of the Related Art

An imaging apparatus such as a video camera, a digital still camera and the like which uses a solid state imaging device, includes means for adjusting an opening area of an iris opening of an image taking lens as an exposure adjusting means, means for adjusting an electronic shutter speed of the solid state imaging device, means for adjusting an amplifier gain of an image signal obtained from the solid state imaging device, and the like.

In all of those exposure adjusting means, there is a limit on the exposure range within which the exposure adjustment can be done without any severe deterioration in the image quality. In particular, the range in which the exposure adjustment can be carried out by the adjustment of the electronic shutter speed and the adjustment of the amplifier gain of an image signal becomes narrower, as the solid state imaging device is miniaturized and the number of pixels is increased. Moreover, in a variable exposure mechanism for adjusting the opening area of the iris, as the iris opening is made small in order to cope with a very bright object, the image quality suddenly becomes worse due to the deterioration of the resolution performance by diffraction when the opening area is reduced to be a certain magnitude.

For this reason, in imaging apparatuses using solid state imaging device, in addition to the above-mentioned type exposure adjusting means, there is such one that uses an exposure adjusting means designed to adjust an exposure amount by placing and removing an ND filter (Neutral Density Filter) at an iris opening of the image taking lens. In particular, the imaging apparatus which uses the exposure adjusting means employing the variable exposure mechanism and the exposure adjusting means applying the ND filter is disclosed in many patent documents.

Patent Document 1: Japanese Laid-Open Patent JP-A-Heisei, 11-84459

Patent Document 2: Japanese Laid-Open Patent JP-A-Heisei, 5-292392

SUMMARY OF THE INVENTION

However, in the case of using the exposure adjusting means of the method of placing and removing the ND filter at the iris opening, when the ND filter partially closes the iris opening (that is, the ND filter is partially inserted), a part of light beams passing through the iris opening transmits through the ND filter, and the remaining of the light beams transmits through air. Generally, a refractive index of a filter material for the ND filter is approximately 1.5, and also the ND filter has a finite thickness. For this reason, there is inevitably a difference with regard to imaging points between the beam transmitted through the ND filter and the beam transmitted through the air that is not covered by the ND filter, and thereby, this consequently causes deterioration in the resolution performance. Simultaneously, when the ND filter becomes at the half covered state, since there is an edge of the ND filter in an optical path, the diffraction phenomenon at the edge causes the deterioration in the resolution performance.

The present invention is proposed in view of the above-mentioned circumstances. Therefore, an object of the present invention is to protect an image quality deterioration by an exposure control and reserve a sufficient image quality with respect to an imaging apparatus having means for carrying out an exposure adjustment by placing and removing an ND filter in and from an iris opening, and at least one exposure adjusting means for the other exposure adjustment.

In order to attain the above-mentioned object, the present invention is characterized in that in an exposure control method of an imaging apparatus which includes an image taking lens having an iris opening, a solid state imaging device, a plurality of exposure adjusting means, means for judging a brightness of an object, and exposure control means for controlling the plurality of exposure adjusting means in accordance with the brightness of the object and obtaining a targeted exposure value, wherein the plurality of exposure adjusting means include first exposure adjusting means for adjusting an exposure amount by placing and removing an ND filter in and from the iris opening and second exposure adjusting means which is at least one of exposure adjusting means for adjusting the exposure amount by adjusting an opening area of the iris opening, exposure adjusting means for adjusting the exposure amount by adjusting an electronic shutter speed of the solid state imaging device, and exposure adjusting means for controlling the exposure amount by controlling an amplifier gain of an image signal obtained from the solid state imaging device. In this exposure control method, the first exposure adjusting means is controlled such that if the brightness of the object is less than a predetermined level, the first exposure adjusting means is maintained at an ND filter fully opened state in which the ND filter does not cover the iris opening at all, and if the brightness of the object is equal to or higher than the predetermined level, the first exposure adjusting means is maintained at an ND filter closed state in which the ND filter covers the entire region of the iris opening, and the second exposure adjusting means is controlled such that, when the first exposure adjusting means exhibits a state transition between the ND filter fully opened state and the ND filter closed state, an exposure changing amount having a magnitude to cancel an exposure changing amount induced from the state transition of the first exposure adjusting means is generated in the second exposure adjusting means.

Also, the present invention is characterized in that in an exposure control method of an imaging apparatus which includes an image taking lens having an iris opening, a solid state imaging device, a plurality of exposure adjusting means, means for judging a brightness of an object, and exposure control means for controlling the plurality of exposure adjusting means in accordance with the brightness of the object and obtaining a targeted exposure value, wherein the plurality of exposure adjusting means include first exposure adjusting means for adjusting an exposure amount by placing and removing an ND filter in and from the iris opening and second exposure adjusting means composed of at least one of exposure adjusting means for adjusting the exposure amount by adjusting an opening area of the iris opening, an exposure adjusting means for adjusting the exposure amount by adjusting an electronic shutter speed of the solid state imaging device, and an exposure adjusting means for controlling the exposure amount by controlling an amplifier gain of an image signal obtained from the solid state imaging device. In this exposure control method, a plurality of map data having definitions different from each other are prepared, wherein the plurality of map data define a combination of a control target value of the first exposure adjusting means and a control target value of the second exposure adjusting means in order to obtain a target exposure value corresponding to the brightness of the object, and the exposure control means selects one of the plurality of map data and carries out the exposure controls of the first exposure adjusting means and the second exposure adjusting means in accordance with the selected map data, and at least one of the plurality of map data directs by carrying out the exposure control in accordance with the map data that the exposure control means:

(1) controls the first exposure adjusting means so that if the brightness of the object is less than a predetermined level, the first exposure adjusting means is maintained at the ND filter fully opened state in the condition where the ND filter does not cover the iris opening at all, and if the brightness of the object is equal to or higher than the predetermined level, the first exposure adjusting means is maintained at the ND filter closed state in the condition where the ND filter covers the entire region of the iris opening; and (2) controls the second exposure adjusting means so that when the first exposure adjusting means exhibits the state transition between the ND filter fully opened state and the ND filter closed state, an exposure changing amount having a magnitude to cancel an exposure changing amount induced from the state transition of the first exposure adjusting means is generated in the second exposure adjusting means.

Also, the present invention is characterized in that in an exposure control method of an imaging apparatus which includes an image taking lens having an iris opening, a solid state imaging device, a plurality of exposure adjusting means, means for judging a brightness of an object, and exposure control means for controlling the plurality of exposure adjusting means in accordance with the brightness of the object and obtaining a targeted exposure value, wherein the plurality of exposure adjusting means include first exposure adjusting means for adjusting an exposure amount by placing and removing an ND filter in and from the iris opening and second exposure adjusting means composed of at least one of the exposure adjusting means for adjusting the exposure amount by adjusting an opening area of the iris opening, exposure adjusting means for adjusting the exposure amount by adjusting an electronic shutter speed of the solid state imaging device, and exposure adjusting means for controlling the exposure amount by controlling an amplifier gain of an image signal obtained from the solid state imaging device. In this exposure control method, one of a first exposure control mode and a second exposure control mode in which the combinations of the control target values of the first exposure adjusting means and the control target values of the second exposure adjusting means for obtaining the targeted exposure value corresponding to the brightness of the subject are different from each other, is selected and then the exposure control is carried out in accordance with the selected exposure control mode. In the first exposure control mode:

(1) the first exposure adjusting means is controlled so as to be state transitioned between the ND filter fully opened state in the condition where the ND filter does not cover the iris opening at all and the ND filter closed state in the condition where the ND filter covers the entire region of the iris opening; and (2) the second exposure adjusting means is controlled continuously or stepwise on the basis of the brightness of the object, and also the second exposure adjusting means is controlled such that if the first exposure adjusting means exhibits the state transition between the ND filter fully opened state and the ND filter closed state, the exposure changing amount having the magnitude to cancel the exposure changing amount induced from the state transition of the first exposure adjusting means is generated in the second exposure adjusting means. Further, in the second exposure control mode, a brightness level of the object is defined to be a first level wherein the second exposure adjusting means begins to exhibit the deterioration in a resolution performance in a case of coping with the brightness of the object by controlling only the second exposure adjusting means while the first exposure adjusting means is maintained at the ND filter fully opened state, and a brightness level of the object is defined to be a second level wherein the second exposure adjusting means begins to exhibit the deterioration in the resolution performance in a case of coping with the brightness of the object by controlling the second exposure adjusting means while the first exposure adjusting means is maintained at the ND filter closed state, and (3) if the brightness level of the object is in the range less than the first level, the second exposure adjusting means is controlled continuously or stepwise while the first exposure adjusting means is maintained at the ND filter fully opened state;

(4) if the brightness of the object is in the range equal to or higher than the first level and less than the second level, the second exposure adjusting means is fixed and the first exposure adjusting means is controlled continuously or stepwise between the ND filter fully opened state and the ND filter closed state; and (5) if the brightness of the object is in the range equal to or higher than the second level, the second exposure adjusting means is controlled continuously or stepwise while the first exposure adjusting means is maintained at the ND filter closed state.

According to the present invention, since the half-covered state by the ND filter in association with the exposure control can be excluded as necessary, the sufficient image quality can be reserved.

DESCRIPTION OF THE PREFERRED EMBODIMENTS

Figure 1:
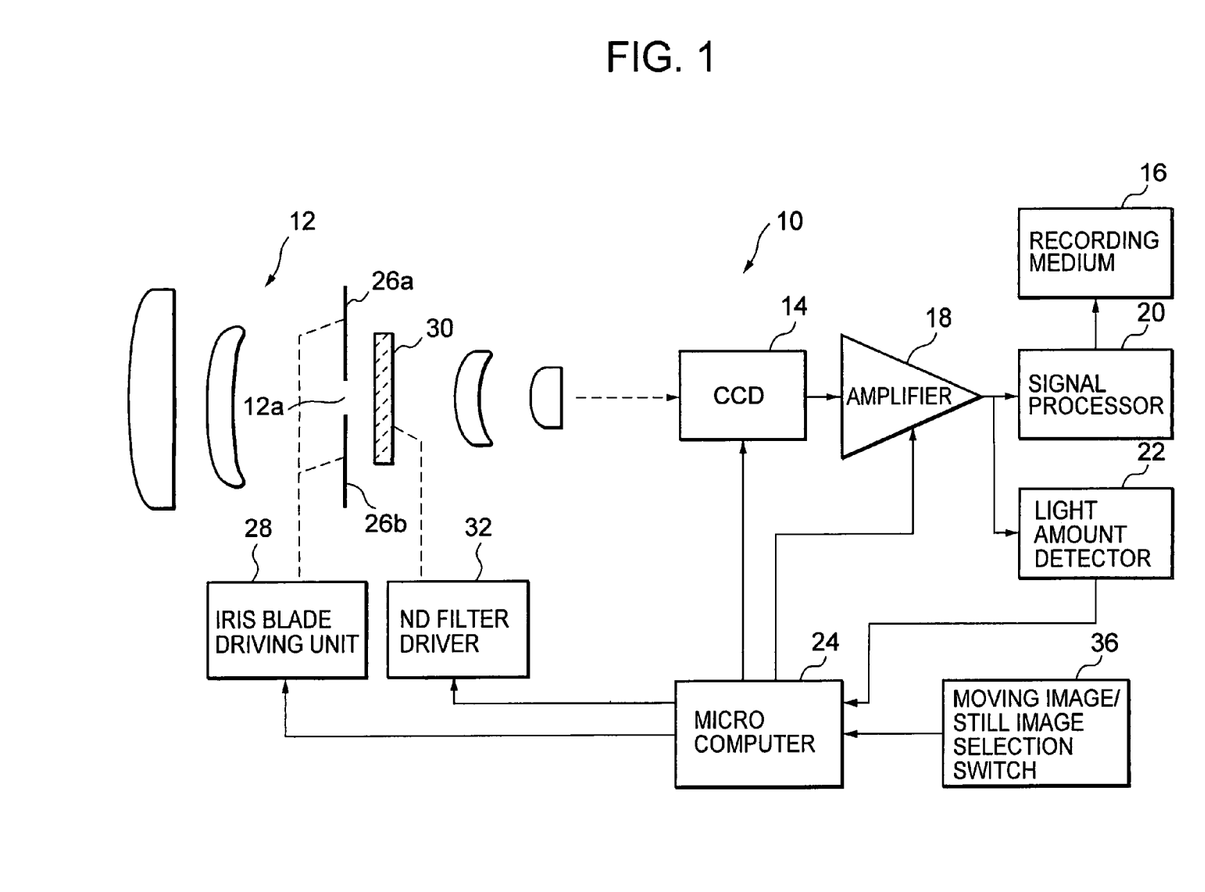
FIG. 1 is a block diagram showing a specific configuration example of an imaging apparatus which can execute an exposure control method according to an embodiment of the present invention.

An embodiment of the present invention will be described below. FIG. 1 is a block diagram showing specific configuration example of an imaging apparatus that is able to execute an exposure control method according to an embodiment of the present invention, FIGS. 2A to 2D are views showing shapes and operation of iris blades of the imaging apparatus in FIG. 1, and FIG. 3 is a view showing a data content of a map data stored in the imaging apparatus of FIG. 1 with a shape of a graph.

An imaging apparatus 10 shown in FIG. 1 includes an image taking lens 12, a CCD 14 that is a solid state imaging device, and a recording medium 16 for image data. The imaging apparatus 10 has a moving image taking mode and a still image taking mode, and they are able to be selected by a user. Thus, this imaging apparatus 10 serves as the imaging apparatus that is able to be used as a video camera for taking a moving image and also is able to be used as a digital still camera for taking a still image.

The imaging apparatus 10 further includes an amplifier 18 for amplifying an output signal from the CCD 14, a signal processor 20 for processing an output signal from the amplifier 18 and generating an image data signal in the form suitable for recoding in the recording medium 16, a light amount detector 22 for processing the output signal from the amplifier 18 and generating a signal (hereafter, referred to as a light amount signal) indicative of the brightness of an object, and a micro computer 24 for performing various controls for above-mentioned configuration. Moreover, a moving image/still image selection switch 36 operated by a user in order to select the moving image taking mode and the still image taking mode is connected to the micro computer 24. This selection switch 36 may be a mechanical switch or a software switch that is provided on a menu screen by the micro computer 24.

The image taking lens 12 has an iris opening 12a, and this iris opening 12a is constituted by a pair of iris blades 26a, 26b which are placed so as to be inserted in and removed from an optical path of the image taking lens 12. The iris blades 26a, 26b are driven continuously or stepwise by an iris blade driving unit 28, so that an opening area of the iris opening 12a can be adjusted continuously or stepwise. Also, the driving of the iris blades 26a, 26b by the iris blade driving unit 28 is controlled by the micro computer 24.

Figure 2A:
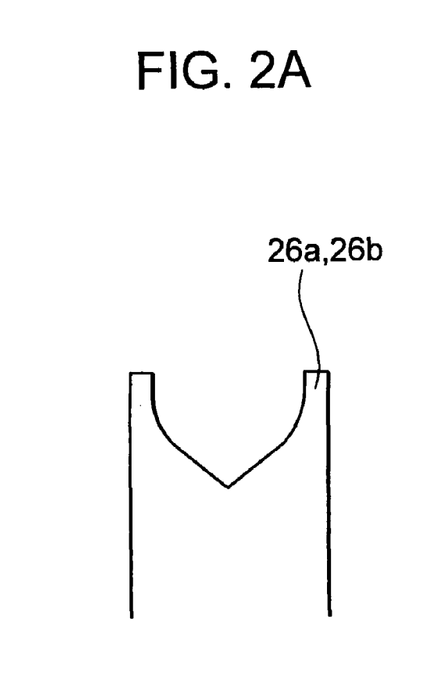
FIGS. 2A to 2D are views showing the shape and operation of iris blades of the imaging apparatus in FIG. 1.
Figure 2B:
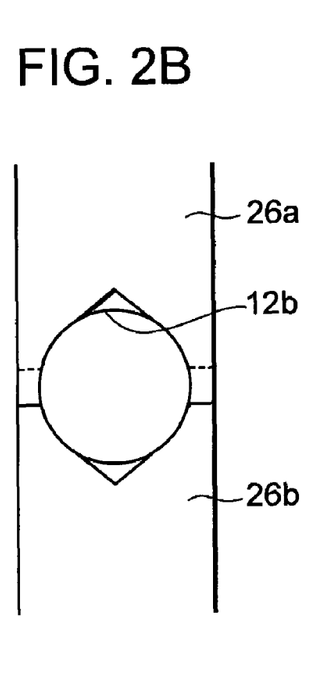
Figure 2C:
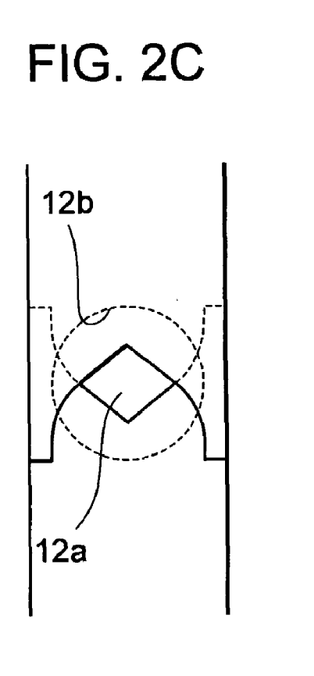
Figure 2D:
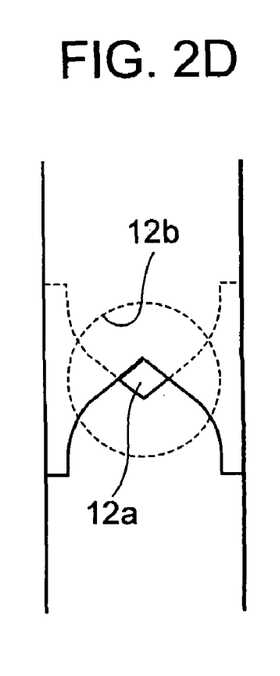
Figure 3:
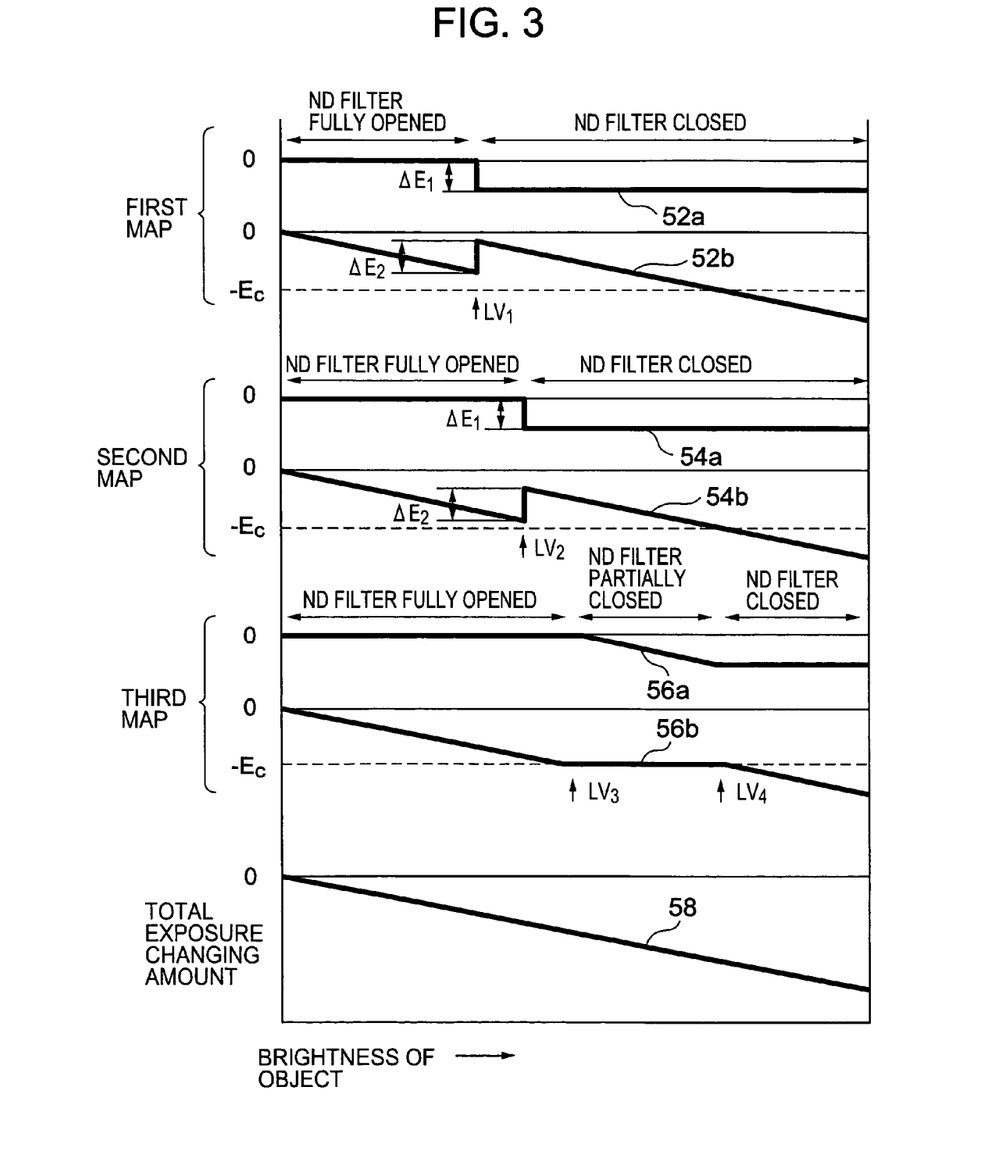
FIG. 3 is a view showing a data content of a map data stored in the imaging apparatus of FIG. 1 with shape of a graph.

FIGS. 2A to 2D are views showing the shape and operation of the iris blades 26a, 26b. FIG. 2A shows the shape of the iris blade 26a or 26b when they are viewed from the front. FIG. 2B shows the manner that the iris blades 26a, 26b are located at a maximum iris position, and the optical path 12b of the image taking lens is fully opened in this position. FIG. 2C shows the manner that the iris blades 26a, 26b are closed up to the positions where the deterioration in the resolution performance caused by the diffraction begins to be induced, and the opening area of the iris blade 26a is reduced to consequently close the considerable portion of the optical path 12b. FIG. 2D shows the manner that the iris blades 26a, 26b are closed up to the minimum iris positions, and the opening area of the iris opening 12a becomes extremely small.

The image taking lens 12 includes an ND filter 30, and this ND filter 30 is driven by an ND filter driver 32, and placed in and removed from the iris opening 12a. The ND filter driver 32 in the illustrated example is designed such that the ND filter driver 32 is able to drive the ND filter 30 continuously or stepwise between a fully opened ND filter state where the ND filter 30 does not cover the iris opening 12a at all, and a closed ND filter state where the ND filter 30 covers the entire region of the iris opening 12a, and the ND filter 30 is arrange to be able to quickly perform the state transition from the fully opened ND filter state to the closed ND filter state or vice versa. Those drive and state transition are controlled by the micro computer 24.

In the above-mentioned configuration, the ND filter 30 and the ND filter driver 32 constitute first exposure adjusting means for the imaging apparatus 10, and the iris blades 26a, 26b and the iris blade driving unit 28 constitute second exposure adjusting means for the imaging apparatus 10. Then, the micro computer 24 controls those first exposure adjusting means and second exposure adjusting means in accordance with the exposure control method of the present invention, and consequently carries out the exposure control for the imaging apparatus 10.

The targeted exposure value of the imaging apparatus 10 is determined on the basis of the brightness of the object. For this reason, the micro computer 24 controls the first exposure adjusting means and the second exposure adjusting means in accordance with the brightness of the object. At that time, as the rate of the portion covered with the ND filter 30 to the opening area of the iris opening 12a is set to be larger, the exposure changing amount (exposure drop amount) by the first exposure adjusting means becomes larger. Also, as the iris blades 26a, 26b are driven to close, the exposure changing amount (exposure drop amount) by the second exposure adjusting means becomes larger. Then, the sum of the exposure changing amount of the first exposure adjusting means determined by the position of the ND filter 30 and the exposure changing amount of the second exposure adjusting means determined by the positions of the iris blades 26a, 26b becomes the total exposure changing amount as the imaging apparatus 10.

The micro computer 24 stores the map data to define the respective values of the exposure changing amount of the first exposure adjusting means and the exposure changing amount of the second exposure adjusting means, which are controlled in order to obtain the targeted exposure value. In particular, in the illustrated example, the three map data of a first map, a second map and a third map are stored as the above-mentioned map data, and the micro computer 24 selects one map among those three maps in accordance with the condition, and controls the first exposure adjusting means and the second exposure adjusting means in accordance with the selected map.

FIG. 3 shows the data contents of the fist to third maps in the shapes of graphs. In the graph of FIG. 3, the horizontal axis indicates the brightness of the object represented by the light amount signal, and the object becomes brighter as goes to right on the graph, and the scale of the graph is a logarithmic scale. The vertical axis indicates the exposure changing amount generated by the first exposure adjusting means or second exposure adjusting means. As for the first exposure adjusting means, the ND filter fully opened state is used as the standard. As the ND filter 30 protrudes to the iris opening 12a, the exposure changing amount (exposure drop amount) becomes larger. At the ND filter closed state, the exposure changing amount becomes maximum (the exposure becomes minimum). Also, as for the second exposure adjusting means, the case when the iris blades 26a, 26b are located at the maximum iris position (as shown in FIG. 2B) is used as the standard. As the iris blade is closed, the exposure changing amount (exposure drop amount) becomes larger. At the minimum iris position (FIG. 2D), the exposure changing amount becomes maximum (the exposure becomes minimum).

In the first map shown on the top stage of FIG. 3, the exposure changing amount of the first exposure adjusting means is defined as indicated by a curve 52a, and the exposure changing amount of the second exposure adjusting means is defined as indicated by a curve 52b. According to this first map, the first exposure adjusting means is controlled such that if the brightness of the object is less than a predetermined first level $LV_1$, it is maintained at the ND filter fully opened state, and in the case equal to or higher than the first level $LV_1$, it is maintained at the ND filter closed state. Between the ND filter fully opened state and the ND filter closed state, there is a difference of $\Delta E_1$ in the exposure changing amount. On the other hand, the second exposure adjusting means is controlled such that even in the range that the brightness of the object is less than the first level $LV_1$, or even in the range equal to or higher than the first level $LV_1$, as the brightness of the object becomes larger, the iris blades 26a, 26b are closed continuously or stepwise. However, the points corresponding to the first level $LV_1$ are the discontinuous points. If the brightness of the object is increased so as to intersect those points, it is controlled such that the exposure changing amount is decreased by $\Delta E_2$. On the contrary, if the brightness of the object is decreased so as to intersect those points, it is controlled such that the exposure changing amount is increased by $\Delta E_2$. Moreover, the magnitudes of $\Delta E_1$ and $\Delta E_2$ are set to be equal. Also, the exposure changing amount—Ec of the second exposure adjusting means shown in FIG. 3 indicates the exposure changing amounts corresponding to the positions when the deterioration in the resolution performance caused by the diffraction begins to be induced when the iris blades 26a, 26b are driven to close.

The first map is defined as mentioned above. Thus, when the micro computer 24 executes the exposure control in accordance with this first map, if the brightness of the object is changed so as to intersect the first level $LV_1$, the micro computer 24 controls the first exposure adjusting means, and carries out the state transition between the ND filter fully opened state and the ND filter closed state, and further controls the second exposure adjusting means so that the exposure changing amount having the magnitude to cancel the exposure changing amount induced from the state transition of the first exposure adjusting means is generated in the second exposure adjusting means. As the result of the execution of the above-mentioned control, the total exposure changing amount as the imaging apparatus 10 is uniformly changed depending on the increase and decrease in the brightness of the object, as represented by a curve 58 on the bottom stage of FIG. 3. And, according to the above-mentioned control, the situation (half covered state) at which the ND filter 30 covers a part of the iris opening 12a is not induced, therefore the deterioration in the resolution performance associated with the situation is never brought about. Moreover, until the brightness level of the object becomes relatively high, the iris blades 26a, 26b are not extremely controlled to throttle. Thus, the deterioration in the resolution performance caused by the diffraction is not induced.

In the second map shown on the second stage from the top of FIG. 3, the exposure changing amount of the first exposure adjusting means is defined as indicated by a curve 54a, and the exposure changing amount of the second exposure adjusting means is defined as indicated by a curve 54b. The difference of this second map from the first map lies in the fact that the point at which the exposure changing amounts of the first exposure adjusting means and second exposure adjusting means are changed in the stepped manner is not the point at which the brightness of the object becomes at the first level $LV_1$ and is the point at which the brightness of the object becomes at a predetermined second level $LV_2$ different from it, and with regard to the others, the second map is not changed from the first map at all.

The micro computer 24, when carrying out the exposing control in accordance with the first map, if the brightness of the object is changed so as to intersect the first level $LV_1$ and if the controls of the first exposure adjusting means and second exposure adjusting means are carried out in association with the change (namely, the first exposure adjusting means exhibits the state transition between the ND filter fully opened state and the ND filter closed state), changes the selection map data from the first map to the second map, at that point. Also, the micro computer 24, when carrying out the exposing control in accordance with the second map, if the brightness of the object is changed so as to intersect the second level $LV_2$ and if the controls of the first exposure adjusting means and second exposure adjusting means are carried out in association with the change (namely, the first exposure adjusting means exhibits the state transition between the ND filter fully opened state and the ND filter closed state), changes the selection map data from the second map to the first map, at that point. In this way, due to the execution of the change between the first map and the second map, even if the brightness of the object is varied in the vicinity of the first level $LV_1$ or in the vicinity of the second level $LV_2$, it is possible to protect the driving for performing the state transition on the ND filter 30 from being frequently executed. By the way, the first level $LV_1$ and the second level $LV_2$ may be established so as to be separated by about ⅓ steps to 3 steps, with respect to the number of the iris steps.

In the third map shown on the third stage from the top of FIG. 3, the exposure changing amount of the first exposure adjusting means is defined as indicated by a curve 56a, and the exposure changing amount of the second exposure adjusting means is defined as indicated by a curve 56b. According to those illustrated curves, while the first exposure adjusting means is maintained at the ND filter fully opened state, if only the second exposure adjusting means is controlled to cope with the brightness of the object, when the second exposure adjusting means begins to exhibit the deterioration in the resolution performance, the brightness level of the object is assumed to be a third level $LV_3$, and while the first exposure adjusting means is maintained at the ND filter closed state, if only the second exposure adjusting means is controlled to cope with the brightness of the object, when the second exposure adjusting means begins to exhibit the deterioration in the resolution performance, the brightness level of the object is assumed to be a fourth level $LV_4$. Then, the micro computer 24 is defined to:

(1) control the second exposure adjusting means continuously or stepwise while the first exposure adjusting means is maintained at the ND filter fully opened state in the range that the brightness level of the object is less than the third level $LV_3$;

(2) control the first exposure adjusting means continuously or stepwise between the ND filter fully opened state and the ND filter closed state while the second exposure adjusting means is fixed in the range that the brightness of the object is equal to or higher than the third level $LV_3$ and less than the fourth level $LV_4$; and (3) control the second exposure adjusting means continuously or stepwise while the first exposure adjusting means is maintained at the ND filter closed state in the range that the brightness of the object is equal to or higher than the fourth level $LV_4$.

For this reason, when the micro computer 24 carries out the exposing control in accordance with this third map, if the brightness level of the object becomes between the third level $LV_3$ and the fourth level $LV_4$, the ND filter 30 becomes at the situation that the iris opening 12a is partially closed (the half covered state), which thereby causes the deterioration in the resolution performance. However, on the other hand, according to the exposing control in accordance with this third map, in the entire region of the brightness level of the object, only the continuous or stepwise-control of the iris blades 26a, 26b or ND filter 30 is carried out, which does not bring about the operation where the ND filter 30 is state transitioned between the fully opened state and the closed state. Thus, the merit that the exposing control is further smoothly performed can be obtained.

In the exposure control when the moving image is taken, continuity and smoothness are strongly required. On the other hand, as compared with the case when the still image is taken, the required performance of the resolution is not so severe. On the contrary, when the still image is taken, the required performance of the resolution is high, and on the other hand, since the image recording is done after the exposure is fixed, the requirement of the tracking smoothness is low. So, if the third map is selected when the moving image taking mode is selected by the user, and if either the first map or second map is selected when the still image taking mode is selected, the image taking operation in which at the moving image taking mode, a priority is given to the smoothness of the exposure tracking, and at the still image taking mode, a priority is given to the resolution performance, becomes possible. This switching between the exposure control modes can be attained by the mechanism in which, when the user operates the moving image/still image selection switch 36, the micro computer 24 selects the map corresponding to the selection. Also, as the recording medium 16 equipped within the imaging apparatus having both a large capacity medium, such as a tape, a disk, or the like, and a semiconductor recording medium, most of the moving image is recorded in the former medium, and most of the still image is recorded in the latter medium. Thus, even if the selection of the map is designed to be changed in conjunction with the selection switch of the recording medium, the exposure control mode is switched in accordance with the selection, and the similar result is obtained.

Moreover, the following method may be considered. That is, the imaging apparatus includes an exposure control mode selection switch that is able to be operated by the user, and the selection of the map data based on the operation of the switch enables the user to freely select the exposure control mode. Also, the following method may be considered. That is, by setting the exposure control mode selection switch to be valid only if the moving image taking mode is selected or only if the still image taking mode is selected, the user can freely select the exposure control mode, only at the time of the particular image taking mode. Moreover, the exposure control mode may be selected depending on the image recording size selected by the user.

Also, in a case of the imaging apparatus is designed such that it enters a still image taking monitoring mode if a shutter release button is half pushed, and the shutter release button is further pushed to execute the still image taking, when the still image is taken, the exposure control in accordance with the first map or second map from the time of the monitoring may be carried out. However, another method may considered such that, when it enters the still image taking monitoring mode, the third map may be selected and when the shutter release button is further pushed to execute the still image taking, the selection map data may be changed to the first map or second map. When this method is used, the exposure control at the time of the monitoring can be made smoother because the resolution performance is not required so much.

Also, the ND filter driver 32 can be provided with, for example, a filter supporting mechanism that is a mechanical mechanism for movably supporting the ND filter 30, an actuator for driving the filter supporting mechanism, and a filter position detector for detecting the position of the ND filter 30. In that case, the filter supporting mechanism or actuator contains a pair of mechanical stoppers for regulating the movement limits at both ends of the movement range of the ND filter 30. When the ND filter driver 32 having the above-mentioned configuration is employed, the ND filter 30 may be set at the fully opened state or closed state at the position before it is brought into contact with those mechanical stoppers. Consequently, when the first exposure adjusting means is state transitioned between the ND filter fully opened state and the closed state, it is possible to avoid the ND filter 30 from colliding against the mechanical stopper, and accordingly possible to relax the disturbance in the exposure at the time of the state transition, and simultaneously possible to shorten the time necessary for the state transition.

Also, as the ND filter 30, in a case of using the ND filter having a plurality of stripe-shaped density concentration regions and having the densities of many steps, in such a way that a boundary line between the concentration regions does not cover the iris opening 12a when the ND filter is changed to the closed state, the width of the concentration region of the ND filter may be set to be equal to or greater than a diameter of the iris opening 12a when the ND filter covers. If the concentration boundary is located within the opening, the variation in the exposure is induced until the movement of the ND filter terminates. However, by avoiding this, it is possible to relax the disturbance in the exposure at the time of the state transition and simultaneously possible to shorten the time necessary for the state transition.

Moreover, in the above-mentioned embodiment, the second exposure adjusting means carries out the exposure adjustment by throttling the iris blades 26a, 26b. However, the second exposure adjusting means can have the configuration other than this. For example, the exposure adjustment can be done such that the electronic shutter speed of the CCD 14 is controlled by the micro computer 24. Also, the exposure adjustment can be done such that the amplifier gain of the amplifier 18 is controlled by the micro computer 24. They can be used as the second exposure adjusting means. Moreover, several of those exposure-adjusting means may be combined and used. Thus, the second exposure adjusting means used in the present invention can be provided with at least one of the exposure adjusting means for adjusting the exposure amount by adjusting the opening area of the iris opening, the exposure adjusting means for adjusting the exposure amount by adjusting the electronic shutter speed of the solid state imaging device, and the exposure adjusting means for controlling the exposure amount by controlling the amplifier gain of the image signal obtained from the solid state imaging device.

What is claimed is:

1. An exposure control method of an imaging apparatus which includes an image taking lens having an iris opening, a solid state imaging device, a plurality of exposure adjusting means, means for judging a brightness of an object, and exposure control means for controlling the plurality of exposure adjusting means in accordance with the brightness of the object and obtaining a targeted exposure value, wherein the plurality of exposure adjusting means include first exposure adjusting means for adjusting an exposure amount by placing and removing an ND filter in and from the iris opening and second exposure adjusting means composed of at least one of exposure adjusting means for adjusting the exposure amount by adjusting an opening area of the iris opening, an exposure adjusting means for adjusting the exposure amount by adjusting an electronic shutter speed of the solid state imaging device, and an exposure adjusting means for controlling the exposure amount by controlling an amplifier gain of an image signal obtained from the solid state imaging device, said exposure control method comprising the steps of:

preparing a plurality of map data having definitions different from each other, wherein the plurality of map data define a combination of a control target value of the first exposure adjusting means and a control target value of the second exposure adjusting means in order to obtain a target exposure value corresponding to the brightness of the object; and selecting one of the plurality of map data and carrying out the exposure controls of the first exposure adjusting means and the second exposure adjusting means in accordance with the selected map data; wherein said exposure control means carries out the exposure control in accordance with at least one of the plurality of map data among the plurality of map data so that the exposure control means; (1) controls the first exposure adjusting means so that if the brightness of the object is less than a predetermined level, the first exposure adjusting means is maintained at the ND filter fully opened state in the condition where the ND filter does not cover the iris opening at all, and if the brightness of the object is equal to or higher than the predetermined level, the first exposure adjusting means is maintained at the ND filter closed state in the condition where the ND filter covers the entire region of the iris opening; and (2) controls the second exposure adjusting means so that when the first exposure adjusting means exhibits the state transition between the ND filter fully opened state and the ND filter closed state, an exposure changing amount having a magnitude to cancel an exposure changing amount induced from the state transition of the first exposure adjusting means is generated in the second exposure adjusting means, wherein;

said plurality of map data include first map data and second map data; said exposure control means carries out the exposure control in accordance with the first map data so that the exposure control means; (1) controls the first exposure adjusting means so that if the brightness of the object is less than a first level, the first exposure adjusting means is maintained at the ND filter fully opened state in the condition where the ND filter does not cover the iris opening at all, and if the brightness of the object is equal to or higher than the first level, the first exposure adjusting means is maintained at the ND filter closed state in the condition where the ND filter covers the entire region of the iris opening; and (2) controls the second exposure adjusting means so that when the first exposure adjusting means exhibits the state transition between the ND filter fully opened state and the ND filter closed state, an exposure changing amount having a magnitude to cancel an exposure changing amount induced from the state transition of the first exposure adjusting means is generated in the second exposure adjusting means; wherein said exposure control means carries out the exposure control in accordance with the second map data so that the exposure control means; (1) controls the first exposure adjusting means so that if the brightness of the object is less than a second level which is different from the first level, the first exposure adjusting means is maintained at the ND filter fully opened state in the condition where the ND filter does not cover the iris opening at all, and if the brightness of the object is equal to or higher than the second level, the first exposure adjusting means is maintained at the ND filter closed state in the condition where the ND filter covers the entire region of the iris opening; and (2) controls the second exposure adjusting means so that when the first exposure adjusting means exhibits the state transition between the ND filter fully opened state and the ND filter closed state, an exposure changing amount having a magnitude to cancel an exposure changing amount induced from the state transition of the first exposure adjusting means is generated in the second exposure adjusting means; and wherein said selected map data is changed from the first map data to second map data in case when said first exposure adjusting means exhibits the state transition while carrying out the exposure control in accordance with the first map data, and said selected map data is changed from the second map data to first map data in case when said first exposure adjusting means exhibits the state transition while carrying out the exposure control in accordance with the second map data.

2. An exposure control method of an imaging apparatus which includes an image taking lens having an iris opening, a solid state imaging device, a plurality of exposure adjusting means, means for judging a brightness of an object, and exposure control means for controlling the plurality of exposure adjusting means in accordance with the brightness of the object and obtaining a targeted exposure value, wherein the plurality of exposure adjusting means include first exposure adjusting means for adjusting an exposure amount by placing and removing an ND filter in and from the iris opening and second exposure adjusting means composed of at least one of the exposure adjusting means for adjusting the exposure amount by adjusting an opening area of the iris opening, exposure adjusting means for adjusting the exposure amount by adjusting an electronic shutter speed of the solid state imaging device, and exposure adjusting means for controlling the exposure amount by controlling an amplifier gain of an image signal obtained from the solid state imaging device, said exposure control method comprising the steps of:

selecting one of a first exposure control mode and a second exposure control mode in which the combinations of the control target values of the first exposure adjusting means and the control target values of the second exposure adjusting means for obtaining the targeted exposure value corresponding to the brightness of the subject are different from each other; and carrying out the exposure control in accordance with the selected exposure control mode by said selected mode, wherein;

in the first exposure control mode:

(1) the first exposure adjusting means is controlled so as to be state transitioned between the ND filter fully opened state in the condition where the ND filter does not cover the iris opening at all and the ND filter closed state in the condition where the ND filter covers the entire region of the iris opening; and (2) the second exposure adjusting means is controlled continuously or stepwise on the basis of the brightness of the object, and also the second exposure adjusting means is controlled such that if the first exposure adjusting means exhibits the state transition between the ND filter fully opened state and the ND filter closed state, the exposure changing amount having the magnitude to cancel the exposure changing amount induced from the state transition of the first exposure adjusting means is generated in the second exposure adjusting means; and in the second exposure control mode, a brightness level of the object is defined to be a first level wherein the second exposure adjusting means begins to exhibit the deterioration in a resolution performance in a case of coping with the brightness of the object by controlling only the second exposure adjusting means while the first exposure adjusting means is maintained at the ND filter fully opened state, and a brightness level of the object is defined to be a second level wherein the second exposure adjusting means begins to exhibit the deterioration in the resolution performance in a case of coping with the brightness of the object by controlling only the second exposure adjusting means while the first exposure adjusting means is maintained at the ND filter closed state, and (3) if the brightness level of the object is in the range less than the first level, the second exposure adjusting means is controlled continuously or stepwise while the first exposure adjusting means is maintained at the ND filter fully opened state;

(4) if the brightness of the object is in the range equal to or higher than the first level and less than the second level, the second exposure adjusting means is fixed and the first exposure adjusting means is controlled continuously or stepwise between the ND filter fully opened state and the ND filter closed state; and (5) if the brightness of the object is in the range equal to or higher than the second level, the second exposure adjusting means is controlled continuously or stepwise while the first exposure adjusting means is maintained at the ND filter closed state.

3. The exposure control method as cited in claim 2, wherein;

said imaging apparatus further includes; a moving image taking mode, and a still image taking mode which are selected by user; and said second exposure control mode is carried out when said moving image taking mode is selected, and said first exposure control mode is carried out when said still image taking mode is selected.

4. The exposure control method as cited in claim 2, wherein;

said imaging apparatus is configured to enter into a still image taking monitor mode when a release button is semi-depressed and to carry out a still image taking when the release button is fully-depressed;

said second exposure control mode is carried out when entering into the still image taking monitor mode; and said first exposure control mode is carried out when carrying out the still image taking.

5. The exposure control method as cited in claim 2, wherein;

said imaging apparatus further includes an exposure control mode selection switch which a user is able to operate; and one of the first exposure control mode and the second exposure control mode is carried out by selecting in response to the operation of the exposure control mode selection switch.

* * * * *